Feb. 9, 1932.  F. H. OWENS  1,843,928
SPRING MOTOR AND CONTROL THEREFOR
Filed Dec. 1, 1928
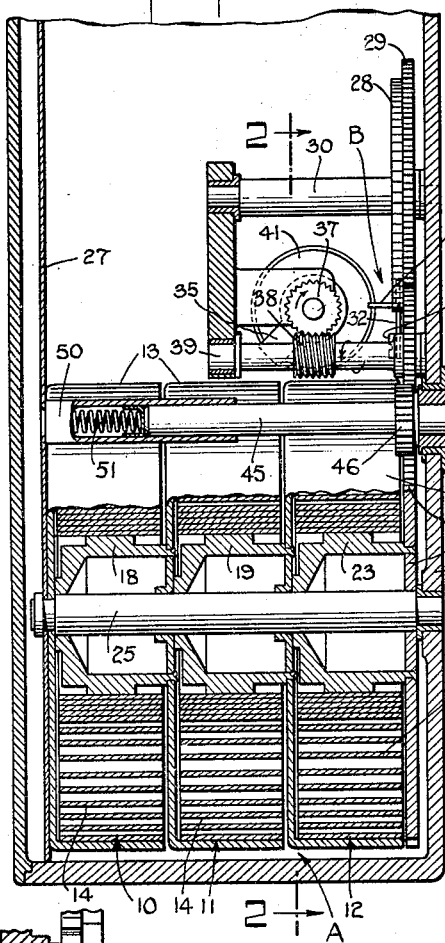
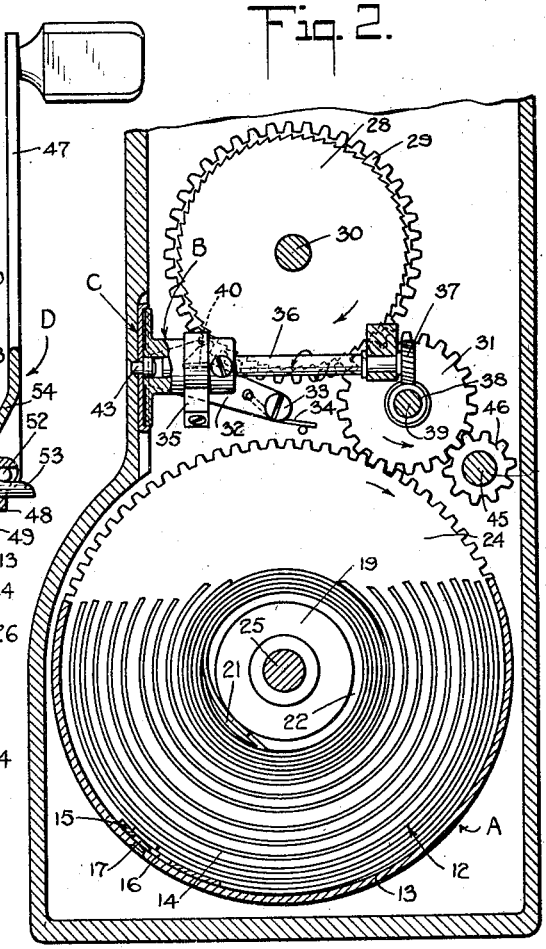
INVENTOR
Freeman H. Owens
BY
Cavanagh & Jones
ATTORNEYS Patented Feb. 9, 1932

1,843,928

UNITED STATES PATENT OFFICE

FREEMAN H. OWENS, OF NEW YORK, N. Y.

SPRING MOTOR AND CONTROL THEREFOR

Application filed December 1, 1928. Serial No. 323,169.

This invention relates to a spring motor and a control therefor and has special reference to the provision of a spring motor mechanism especially adapted for use in motion picture machines.

A prime object of my present invention is directed to the provision of a spring motor mechanism embodying means for utilizing a predetermined range of energization of said motor whereby only the relatively strong part of the motor drive is employed and the weak part of the motor drive is eliminated. The spring motor mechanism of the present invention is particularly intended for use in securing a uniform driving action of apparatus operated by the motor, such apparatus being, for example, the driving mechanism of a motion picture machine wherein it is found desirable to effect a uniform feeding of the motion picture film over an extended period of time through the action of a spring motor.

A still further prime object of the invention centers about the provision of a spring motor embodying means for utilizing a predetermined range of energization of the motor so as to eliminate the low state of energization of the motor and embodying an indicating means for indicating at any time the state of energization of the motor within such predetermined range. As applied to a motion picture machine the invention further includes the provision of a motor mechanism and a control and indicating means therefor wherein the indicating means operates for giving information of the state of energization of the motor in terms of motion picture film length, whereby the operator is at all times apprised of the length of motion picture film that remains to be driven by the motor until its predetermined low state of energization is reached.

Still further prime objects of the invention include the provision of a spring motor particularly adapted for motion picture apparatus embodying improvements in the means for winding and rewinding the motor, and the still further provision of an improved sectional spring motor particularly adapted for motion picture machines designed and constructed for light weight and compact use and for operation over a substantial period of time between rewinding steps.

To the accomplishment of the foregoing and such other objects as will hereinafter appear, my invention consists in the elements and their relation one to the other, as hereinafter more particularly described and sought to be defined in the claims; reference being had to the accompanying drawings which show the preferred embodiments of my invention, and in which:

Fig. 1 is an elevational view taken in cross-section of the spring motor mechanism and control means therefor of my present invention;

Fig. 2 is a view thereof taken in cross-section in the plane of the line 2, 2 of Fig. 1;

Fig. 3 is a fragmentary view thereof with parts shown in cross-section and other parts broken away; and Fig. 4 are perspective views of details.

Referring now more in detail to the drawings, the spring motor mechanism of the invention is shown to comprise a sectional spring motor generally designated as A, a control means generally designated as B for controlling the operation of the motor A to predetermine its useful range to secure a uniform driving action, an indicating device C for indicating at all times the degree of energization of the motor A within said predetermined useful range, and a rewinding device D operative for rewinding the motor A and for returning the control means B and indicating device C to positions corresponding to the re-energized condition of the motor A.

The motor A preferably comprises a sectional spring motor which includes a plurality such, for example, as three spring motor sections 10, 11 and 12 which are assemblable together into a unit, said unit being compactly organized for producing a drive of substantially long duration. The sections 10, 11 and 12 are designed and constructed so as to be quickly assembled together for use or rapidly disassembled for repair or adjustment; and to accomplish this each of the sections includes a casing body 13 which houses the motor spring 14, an end 15 of the spring of each section being secured to the wall of the casing 13 by the engagement of a slot 16 in such spring end 15 and by a headed stud 17 fixedly seated in a wall of the casing 13, as clearly shown in Fig. 2 of the drawings. As will be evident from Fig. 2 of the drawings, the spring 14 may by this means be readily attached to or detached from the casing 13.

For interconnecting the spring motor sections 10 to 12 and for joining the springs 14 thereof, two of the casings 13, 13 are provided with externally arranged hub members which are receivable by the springs of the next adjacent sections. Thus the middle casing 13 is provided with a hub member 18 fixedly attached externally thereto and an end casing 13 is similarly provided with a hub member 19 (shown in detail in Fig. 4 of the drawings), these hub members being received by and being attached to the springs 14 of the adjacent casings, the manner of attachment being best indicated in Figs. 2 and 4 of the drawings. As shown in Figs. 2 and 4, the inner end of the spring 14 is provided with a triangularly contoured slot 20 which is received by a similarly contoured and slitted portion 21 which is continuous with the annular spring seat 22 of the hub 19, these parts being preferably made continuous so as to permit the obtaining of the desired concentricity of the spring convolutions, as shown in Fig. 2 of the drawings. For joinder to the spring of the terminal casing section 13, there is provided a third hub member 23 similar to the members 18 and 19, which is affixed to a driving gear 24, the driving gear as well as the hub members 18, 19 and 23 being received by and for free rotation on a spindle 25, which latter is journalled in a housing or casing 26 and a partition 27 therein, the said housing or casing 26 forming part of the motion picture machine casing.

By means of the construction thus far described, it will be seen that the motor sections 10, 11 and 12 may be readily assembled together to form a motor unit of compact organization and having a driving power of extended duration.

In accordance with one object of the invention, it is desired to provide means for predeterminedly utilizing the strong part of the energization of the motor and to eliminate the weak part of energization thereof; and to accomplish this I provide the means B driven by the motor for stopping the motor at a predetermined point of low state of energization of the same. This means B comprises a ratchet wheel 28 fixed to a driven part such as to a gear 29 or to a shaft 30 which carries said gear, said gear being driven from the motor A through the pinion 31 meshing with the gear 29 and the drive gear 24, with which ratchet wheel cooperates a toothed member 32 pivotally mounted on a headed stud 33 and normally urged by a spring 34 away from the ratchet wheel 28, as clearly shown in Fig. 2 of the drawings. For stopping the motor at a predetermined point such as a point of low state of energization thereof, the toothed member 32 is moved into engagement with the ratchet wheel 28 against the action of the spring 34 and this is accomplished by the provision of an operating member 35 fixed to a shaft 36 which receives motion by connection to the motor A through a worm wheel 37 on the shaft 36 meshing with a worm 38 fixed to a shaft 39, which shaft carries the pinion 31. The operating member 35 comprises a projecting arm which moves to engage a laterally extending finger 40 which may be formed integrally with the toothed member 32, and as will now be understood, when this engagement takes place the toothed member 32 is actuated into engagement with the ratchet 28 to stop the motor A. The operating member 35 is so adjusted that the motor A is stopped at a predetermined low point of energization thereof, such point being determined to eliminate the use of the weak part of the motor drive and to utilize only that portion of the motor drive which effects a uniform driving action of the operated parts of the machine. As applied to motion picture apparatus, the stopping point of the motor is selected so that the motion picture film may be driven at a uniform speed and with a quick start (that is at a low starting inertia) throughout the utilized range of the motor drive.

The indicating means C is designed to indicate in terms of motion picture film length the state of energization of the motor above its stopping point. This indicating means is therefore made to comprise a device operated by the motor A and associated with the control means B therefor, and the indicator includes a dial 41 visible through a window 42 in the casing 26, which dial is journalled in a stud 43 in said casing and is fixed to the shaft 36 or to the operating member 35, all as best shown in Figs. 2 and 3 of the drawings. The dial 41 is calibrated by the numerals 44 in terms of motion picture film footage. As will be evident, the operation of the motor A in both the unwinding and rewinding directions will operate the dialing elements in corresponding directions as shown by the arrows in the figure, so that at all times the state of energization of the motor above its stopping point is indicated at the window 42 in terms of the number of feet of film which remains available to the user prior to the automatic stopping of the motor. The operator may therefore be at all times apprised as to whether the motor need be rewound or not prior to the taking or projection of a given number of feet of film.

The rewinding means D of the motor and control mechanism comprises a movable rewinding shaft 45 provided with a pinion 46 connectible to and disconnectible from the intermediate pinion 31, the said movable rewinding shaft being controlled in its movements by a crank handle 47 which is foldable between operative and inoperative positions, the operative position thereof being indicated in Fig. 1 of the drawings. The shaft 45 is journalled for slidable and rotatable movement at one end in a sleeve 48 rotatable in a bushing 49 and at the other end in a tubular element 50 fixed to the partition 27, the said shaft being urged into gear engaging position by a compression spring 51 housed by the tubular element 50 and active against the inner end of the shaft 45. The crank handle 47 is hinged for folding movement on the sleeve 48 by means of the hinge pintle 52; and said shaft 45 is provided with a reduced projecting portion 53 which is adapted to be engaged by a cammed portion 54 of the handle 47 when the handle is moved about the hinge pintle 52 from the position shown in Fig. 1 to a position 180° with respect thereto. It will now be seen that when the handle 47 is moved to an inoperative position, engagement between the cammed portion 54 thereof and the projecting portion 53 of the shaft 45 causes the shaft to be forced inwardly against the action of the spring 51, this resulting in the disengagement between the pinion 46 thereon and the intermediate pinion 31, the spring motor being then in a condition to operate the driven elements. It will be further evident that when the crank handle 47 is moved from such inoperative position to the operative position shown in Fig. 1 of the drawings, the shaft 45 is released and urged by the spring 51 is moved to cause the engagement between the rewinding pinion 46 and the intermediate pinion 31, so that operation of the crank handle 47 will cause the rewinding of the spring motor A. It will be further apparent that such rewinding action returns the dialing or indicating means A, as well as the operating element 35 and the toothed member 32 of the control means B, to their normal conditions.

The use and operation of the spring motor and control of my present invention and the many advantages thereof will in the main be fully apparent from the above detailed description thereof. It will be further apparent that while I have shown and described my invention in the preferred forms, many changes and modifications may be made in the structure disclosed without departing from the spirit of the invention, defined in the following claims.

I claim:

1. In combination, a spring motor comprising a plurality of spring motor sections connected in series and assembled into a unit, winding means for energizing the same, and means connected to the spring motor and operated by the total unwinding action of the several sections of the spring motor for stopping the motor at a predetermined point of low state of total energization of the same.

2. In combination, a spring motor, winding means for energizing the same, a driven element geared to the motor, and means driven by the spring motor and interposed between the motor and said driven element and operated by the unwinding action of the spring motor for braking the driven element of the motor at a predetermined point of low state of energization of the motor.

3. In combination, a spring motor, winding mechanism for energizing the same, and means connected to the spring motor and operated by the unwinding action of the spring motor for stopping the motor at a predetermined point of low state of energization of the same, said means comprising a ratchet member driven by said motor, a normally disengaged pawl member and a device driven by said motor for causing the pawl member to engage said driven member.

4. In combination, a spring motor, manually operable winding means for energizing the same, means connected to the spring motor by reduction gearing and operated by the unwinding action of the spring motor for positively stopping the spring motor at a predetermined point of low state of energization in order to prevent further unwinding of the same, and means responsive to initial operation of said manually operable winding means for automatically releasing said stopping means.

5. In combination, a spring motor for a motion picture apparatus, winding means for energizing the same, means connected to the spring motor and operated by the unwinding action of the spring motor for stopping the motor at a predetermined point of low state of energization of the same, and an indicating means connected to said motor and operated thereby, said indicating means including a device for indicating at any time in terms of motion picture film length the state of energization of the motor above said stopping point.

6. In combination, a spring motor, winding means for energizing the same, means connected to the spring motor and operated by the unwinding action of the spring motor for stopping the motor at a predetermined point of energization of the same, and an indicating means connected to said motor and operated thereby, said indicating means including a device for indicating at any time the state of energization of the motor above said stopping point.

7. In combination, a spring motor, winding means for energizing the same, means connected to the spring motor and operated by the unwinding action of the spring motor for stopping the motor at a predetermined point of energization of the same, an indicating means connected to said motor and operated thereby, said indicating means including a device for indicating at any time the state of energization of the motor above said stopping point, and means whereby operation of the winding means automatically releases said stopping means.

8. In combination, a spring motor for a motion picture apparatus, winding means for energizing the motor and an indicating means connected to said motor and operated thereby, said indicating means including a device for indicating at any time in terms of motion picture film length the state of energization of the motor which remains available to the user.

9. In combination, a spring motor and a winding means therefor, said winding means comprising a winding shaft connectible to and disconnectible from said motor, a crank handle foldable between operative and inoperative positions, and means connecting said winding shaft with said crank handle whereby movement of the handle to its operative position effects the connection between the shaft and said motor and movement of the handle to its inoperative position effects disconnection between the shaft and said motor.

10. In combination, a spring motor and a winding means therefor, said winding means comprising a slidable winding shaft slidably movable for connection to and disconnection from said motor, a crank handle foldable between operative and inoperative positions, and cam means connecting said winding shaft with said crank handle whereby movement of the handle to its operative position effects the connection between the shaft and said motor and movement of the handle to its inoperative position effects disconnection between the shaft and said motor.

11. In combination, a spring motor provided with a gear and a winding means therefor, said winding means comprising a winding shaft provided with a pinion connectible to and disconnectible from the gear of said motor, a crank handle foldable between operative and inoperative positions, and means connecting said winding shaft with said crank handle whereby movement of the handle to its operative position effects the meshing connection between the pinion and said motor gear and movement of the handle to its inoperative position effects unmeshing between the pinion and said motor gear.

Signed at New York, in the county of New York and State of New York, this 13th day of November, A. D. 1928.

FREEMAN H. OWENS.